United States Patent
Hansma et al.

(10) Patent No.: US 7,278,298 B2
(45) Date of Patent: Oct. 9, 2007

(54) SCANNER FOR PROBE MICROSCOPY

(75) Inventors: Paul K. Hansma, Isla Vista, CA (US); Georg Fantner, Santa Barbara, CA (US); Johannes H. Kindt, Santa Barbara, CA (US)

(73) Assignee: The Regents of the university of California, Oakland, CA (US)

( * ) Notice: Subject to any disclaimer, the term of this patent is extended or adjusted under 35 U.S.C. 154(b) by 5 days.

(21) Appl. No.: 11/000,589

(22) Filed: Nov. 30, 2004

(65) Prior Publication Data

US 2006/0112760 A1    Jun. 1, 2006

(51) Int. Cl.
G01B 5/28 (2006.01)
G01N 13/16 (2006.01)

(52) U.S. Cl. ....................................... 73/105
(58) Field of Classification Search ................. 73/105; 250/442.11
See application file for complete search history.

(56) References Cited

U.S. PATENT DOCUMENTS

| | | | |
|---|---|---|---|
| 4,798,989 A * | 1/1989 | Miyazaki et al. ........... | 310/328 |
| 4,800,274 A | 1/1989 | Hansma et al. | |
| RE034,489 E | 12/1993 | Hansma et al. | |
| 5,656,769 A * | 8/1997 | Nakano et al. ............. | 73/105 |
| 5,825,020 A | 10/1998 | Hansma et al. | |
| 6,246,054 B1 * | 6/2001 | Toda et al. .................. | 250/306 |
| 6,459,088 B1 * | 10/2002 | Yasuda et al. ......... | 250/442.11 |

(Continued)

FOREIGN PATENT DOCUMENTS

EP    594362 A1 *    4/1994

OTHER PUBLICATIONS

G. Binning, et al., "Atomic Force Microscope", Phys. Rev. Lett. 56 (No. 9) (1986) pp. 930.*

(Continued)

Primary Examiner—Daniel S. Larkin
(74) Attorney, Agent, or Firm—Berliner & Associates

(57) ABSTRACT

A scanner for probe microscopy that avoids low resonance frequencies and accounts better for piezo nonlinearities. The x, y and z axes of a linear stack scanner are partially decoupled from each other while maintaining all mechanical joints stiff in the direction of actuation. The scanning probe microscope comprises a probe, a housing, at least two actuators, each coupled to the housing, and a support coupled to the housing and to at least a first of the actuators at a position spaced from the point at which the actuator is coupled to the housing. The support constrains the motion of the first actuator along a first axis while permitting translation along a second axis. The actuators are preferably orthogonally arranged linear stacks of flat piezos, preferably in push-pull configuration. The support can take different forms in different embodiments of the invention. In a particular embodiment, the scanner is a 2D scanner having a support frame with x and y axes, and a member for supporting an object to be moved such as a sample for a probe, the scanner comprising a flexure and flexure coupled cross-conformed piezos arranged along x and y axes. Expansion of the piezos is measured by at least two strain gauges disposed to measure the differential motion of at least two opposed actuators. The strain gauges are preferably arranged to compensate for ambient temperature changes, and preferably two or more strain gauges of identical type are disposed on each actuator to magnify the strain signal.

25 Claims, 10 Drawing Sheets

U.S. PATENT DOCUMENTS 6,617,761 B2* 9/2003 Ando et al. ............... 310/328

OTHER PUBLICATIONS

T. R. Albrecht, et al. "Atomic Resolution with the Atomic Force Microscope on Conductors and Nonconductors", J. Vac. Sci. Technol. A 6 (No. 2) Mar./Apr. (1988) pp. 271.*

T. E. Schaffer, et al. "Characterization and Optimization of the Detection Sensitivity of an Atomic Force Microscope for Small Cantilevers", Journal of Applied Physics, (84) (No. 9) Nov. 1, 1998, pp. 4661.*

T. E. Schaffer, et al. "Studies of Vibrating Atomic Force Microscope Cantilevers in Liquid", Journal of Applied Physics, (80) (No. 7) Nov. 1, 1998, pp. 3622.*

T. Ando, et al., "A High-Speed Atomic Force Microscope for Studying Biological Macromolecules in Action", CHEMPHYSCHEM, 4 (2003), pp. 1196.*

D. Rugar, et al. Atomic Force Microscopy, Phys. Today 43 (10) (1990) 23.

G. Schitter, et al., Robust 2DOF-control of a piezoelectric tube scanner for high speed atomic force microscopy, Proceedings of the American Control Conference, Denver, CO, Jun. 4-6, 2003, pp. 3720.

D. A. Walters, et al., Short Cantilevers for Atomic Force Microscopy, Rev. Sci. Instrum. 67 (10) (1996) 3583.

M. B. Viani, et al., Small Cantilevers for force spectroscopy of single molecules, J. Appl. Phys. 86 (4) (1999) 2258.

T. Ando, *A high-speed atomic force microscope for studying biological macromolecules*, Proc. Natl. Acad. Sci. USA 98 (22) (2001) 12468.

Humphris, A D L, Hobbs, J K and Miles, M J, Ultrahigh-speed scanning near field optical microscopy capable of over 100 frames per second, Apl.Phys.Let. 2003,83:6-8.

J. B. Thompson, et al., Assessing the quality of scanning probe microscope designs, Nanotechnology 12 (2001) 394.

T. E. Schaffer, et al., An atomic force microscope using small cantilevers, SPIE—The International Scociety for Optical Engineering, (3009) (1997) 48.

Kindt J H, et al. "Rigid design of fast scanning probe scann .." Ultramicroscopy Elsevier Netherlands, vol. 100. No. 3-4, Aug. 2004), pp. 259-265, XP002365323.

Ando Toshio et al.: "A high-speed atomic force microscope.,," Proceedings of the National Academy of Sciences of the United States of America Oct. 23, 2001, p. 12468-12472.

Suehira N et al: "Low-temperature noncontact,," Review of Scientific Instruments, American Institute of Physics, US, vol. 72, No. 7, Jul. 2001, pp. 2971-2976.

* cited by examiner

1st          2nd

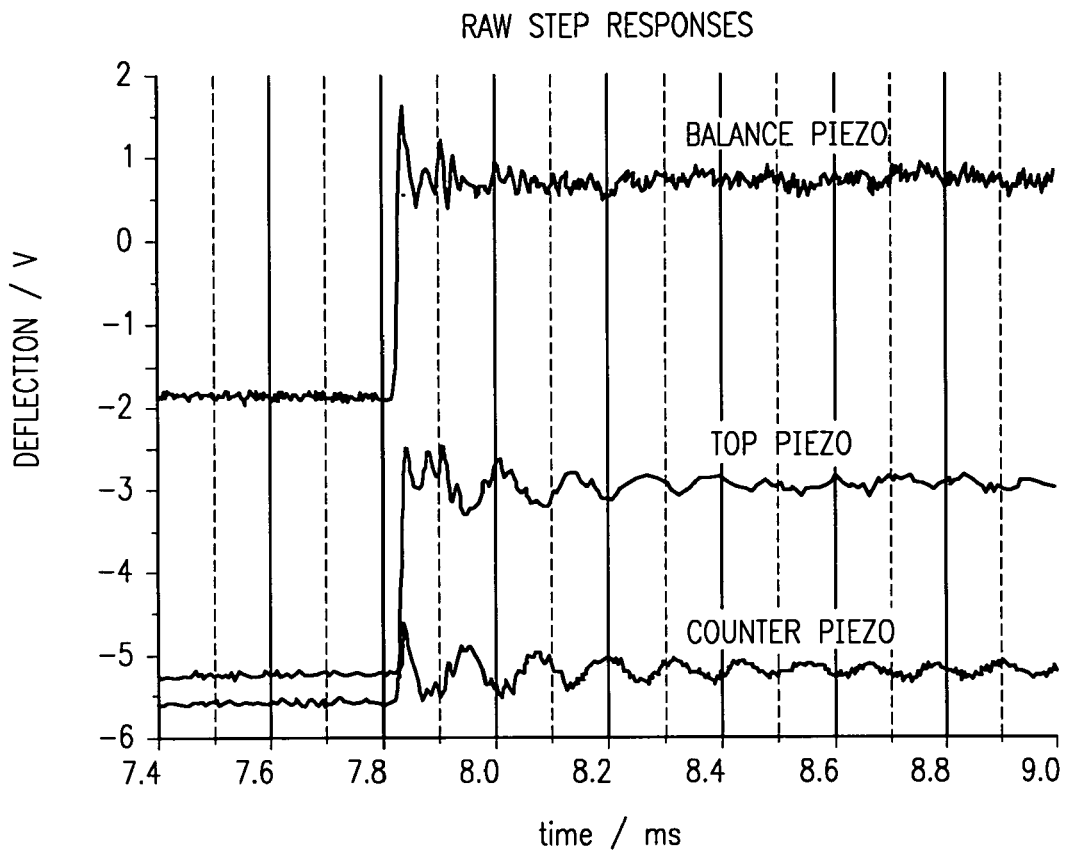
FIG. 18
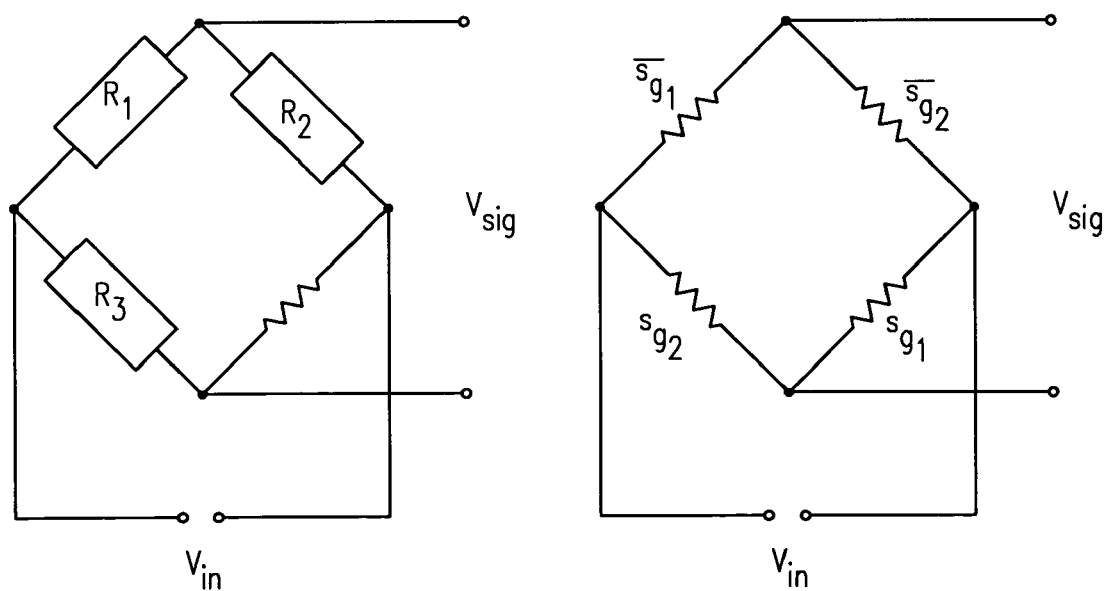
FIG. 19A
FIG. 19B

SCANNER FOR PROBE MICROSCOPY

STATEMENT REGARDING FEDERALLY SPONSORED RESEARCH AND DEVELOPMENT

This invention was made with Government support under Grant No. NSF-DMR9988640 AND NSF-DMR0080034 awarded by the National Science Foundation and by the National Institutes of Health under Award No. NCC-1-02037. The Government has certain rights in this invention.

FIELD OF THE INVENTION

This invention relates to the field of scanning probe devices. More particularly, the invention relates to improvements in an atomic force microscope used to measure the deflections of a cantilever.

BACKGROUND OF THE INVENTION

Scanning probe devices, such as the atomic force microscope ("AFM") have proven to be excellent tools for imaging a wide range of materials such as metals, semiconductors, minerals, polymers, and biomaterials. In an AFM, forces are measured by means of a cantilever that deflects when forces act on it. The deflection of the cantilever is sensed by a detection system, commonly by focusing an incident beam as a spot onto the cantilever and directing the reflected beam onto a segmented detector. Specialized AFMs called "force pullers" have been built for the purpose of pulling on molecules to determine the structure and dynamics of those molecules.

Since its introduction, the AFM and its cantilever sensor have become increasingly more advanced, measuring decreasingly smaller forces and utilizing decreasingly smaller cantilevers. This has introduced problems relating to the sensitivity of the instrument. There is a need to provide greater sensitivity to accommodate the smaller cantilevers and smaller forces that scientific investigators need to either measure samples or manipulate them. Similar detection techniques are also used to monitor the motion of the optical probes used in near-field scanning optical microscopes, scanning ion-conductance microscopes, and a variety of other scanning probe microscopes. The growing field of nanotechnology also provides ample motivation for the precision measurement of the position and/or motion of a wide variety of objects down to the nanometer scale and below.

The development of new small cantilevers with resonance frequencies two orders of magnitude higher than conventional cantilevers make the detection mechanism and the cantilever response much faster than necessary for conventional AFM systems. The speed of AFMs depends on the response time of the detection mechanism (cantilever and readout), the actuator (scanner), the feedback electronics and the piezo driver electronics. These components together form a feedback loop in which the performance of the overall system is affected by phase delays and resonances in any of these components. As the resonance frequencies of new, small cantilevers reach frequencies around 280 kHz even for a soft cantilever (0.006 N/m) in liquid, the new mechanical bandwidth is set by the scanner, and by the mechanical superstructure. Therefore, to further improve the capabilities of the AFM, special attention has to be given to the mechanical design of the scan and detection unit.

One of the main speed determining factors in an AFM system is the scanner, which is generally made with piezo crystals as the actuating components. In many commercially available systems piezo tubes are used to generate the displacement in x, y and z directions. The active part of the scanner consists of a tube made out of piezoelectric material segmented into different sections. Tube scanners use the principle of mechanical amplification to transform the small expansion of the piezos to a larger scan range. Scan ranges of commercial scanners can range from 0.6 µm to 100 µm. This principle reduces the need for large capacitance piezos and reduces the requirements on the amplifier. However, it also results in a weak mechanical structure and therefore a low mechanical resonance frequency (~800 Hz). This is one of the primary speed limits of commercial tube scanners.

Another disadvantage of all kinds of piezos is their nonlinearity in operation. Piezos exhibit a large position hysteresis, up to 30%, with respect to the activating voltage. Piezos are also unstable in their position over time, changing its expansion even with a constant actuation voltage. These nonlinearities are a severe problem for the use of piezos as scanners for AEM as they distort the image, resulting in image drift and making it hard to find the same spot on the sample after zooming in. The hysteresis has to be accounted for either by a mathematical model to correct the actuation voltage or by controlling the actual piezo position in a closed loop feedback. Some commercial scanners model the piezo behavior, and changes in the actuating voltage are made by the controlling software. This approach has several disadvantages:

scanner parameters have to be measured for each individual scanner, with up to thirty parameters needed to model the piezo sufficiently;
  the behavior of the piezo is dependant on the DC offset, scan range and scan frequency; and
  position creep is unaccounted for by the modeling.
  For the user of the AFM this results in:
  image warping (images are expanded in some directions and compressed in others);
  change of image center when zooming in or out; and
  image drift
  incorrectly measured sizes of the objects.

However, this approach does not need any sensors and all the modeling can be done by the software and the digital signal processor.

The following references relate to the background of this invention: (1) C. F. Quate, et al., *Atomic Force Microscope*, Phys. Rev. Lett. 56 (1986) 930; (2) D. Rugar, et al. *Atomic Force Microscopy*, Phys. Today 43 (10) (1990) 23; (3) *Atomic resolution with the atomic force microscope on conductors and nonconductors*, J. Vac. Sci. Technol. A 6 (1988) 271; (4) G. Schitter, et al., *Robust 2DOF-control of a piezoelectric tube scanner for high speed atomic force microscopy*, Proceedings of the American Control Conference, Denver, Colo., Jun. 4-6, 2003, pp. 3720; (5) D. A. Walters, et al., *Short Cantilevers for Atomic Force Microscopy*, Rev. Sci. Instrum. 67 (1996) 3583; (6) M. B. Viani, et al., *Small cantilevers for force spectroscopy of single molecules*, J. Appl. Phys. 86 (4) (1999) 2258; (7) T. Ando, *A high-speed atomic force microscope for studying biological macromolecules*, Proc. Natl. Acad. Sci. USA 98 (22) (2001) 12468; (8) Humphris, A D L, Hobbs, J K and Miles, M J, *Ultrahigh-speed scanning near field optical microscopy capable of over 100 frames per second*, Apl. Phys. Let. 2003,83:6-8; (9) J. B. Thompson, et al., *Assessing the quality of scanning probe microscope designs*, Nanotechnology 12 (2001) 394; (10) T. E. Schaffer, et al., *Characterization and

*optimization of the detection sensitivity of an atomic force microscope for small cantilevers*, Journal of Applied Physics, (84), (No. 9) (2001), 4661; (11) T. E. Schaffer, et al., *An atomic force microscope using small cantilevers, SPIE*—The International Society for Optical Engineering, (3009) (1997) 48; (12) T. E. Schaffer, et al, *Studies of vibrating atomic force microscope cantilevers in liquid*, Journal of Applied Physics, (80) (No. 7) (1996) 3622. See also the following U.S. patents: U.S. Pat. No. 5,825,020-Atomic force microscope for generating a small incident beam spot, U.S. Pat. No. #RE034489-Atomic force microscope with optional replaceable fluid cell, and U.S. Pat. No. 4,800,274-High resolution atomic force microscope. The foregoing publications and patents are all incorporated herein by reference.

SUMMARY OF THE INVENTION

The present invention overcomes the foregoing problems by providing a new type of scanner that avoids low resonance frequencies and accounts better for piezo nonlinearities. In accordance with one embodiment of the invention, we provide what we call a liner stack scanner. The linear stack scanner also uses piezo electric crystals as actuating components. However, these piezos are not single crystals but are made out of insulated layers of piezoelectric material that are electrically connected in parallel. Arranging the single crystals in parallel increases the expansion range of the stack that is determined by the number of stacked single crystals. While each additional layer adds more capacitance to the stack to increase the capacitive load on the amplifier, and the mechanical resonance frequency of the piezo stack is lowered by each additional layer, coupled with the improved mechanical performance enabled by other embodiments of this invention, the linear stack scanner more than compensates for these effects.

In accordance with this invention, the x, y and z axes of the scanner are located perpendicular to each other and, are coupled to each other, but the piezos that actuate the axes are constrained in all directions except for the direction of the desired actuation. The sample area directly responds to piezo actuation with mechanical deformation within elastic limits, while maintaining x-y symmetry to enable image rotation. Speed performance is assured by rigidity in the actuation direction with high first order resonance frequencies, reducing mechanical oscillations while imaging. This is accomplished by each of several embodiments of the invention. In essence, this aspect of the invention provides a scanning probe microscope comprising a probe, a housing, and at least two actuators. Each actuator is coupled to the housing, and a support is coupled to the housing. The support is also coupled to at least one of the actuators at a position spaced from the point at which the actuator is coupled to the housing, for example, at an end opposite the end coupled to the housing. The support constrains the motion of the first actuator along a first axis while permitting translation along a second axis. The actuators are preferably piezoelectric but other types of actuators can be used, for example, electrostrictive, magnetostrictive, and/or electrostatic actuators, or even voice coils or electric motors. The actuators are preferably orthogonally arranged linearly stacked piezos, more preferably in push-pull configuration. The support can take different forms in different embodiments of the invention, as will be described below in detail.

In a specific embodiment, the scanner has a support frame with x and y axes, a centrally disposed member for supporting an object to be moved such as a sample for a probe, and a flexure. Linear piezo stacks are arranged along x and y axes, and flexure couplings formed of blade springs are disposed between the piezos and the support frame on opposite sides of the support frame, arranged so that as there is translation along a first of the x and y axes while blade springs along the second of the x and y axes bend to permit movement along the first axis. There are preferably two piezos for each axis in a push-pull arrangement, which can be referred to as "cross-conformed", so that when one piezo expands, the other one contracts, resulting in translation of the centrally disposed member.

In accordance with another embodiment of the invention, expansion of the piezos is measured by strain gauges, for example metal foil strain gauges. In this aspect, the invention comprises a probe, at least two opposed actuators, and at least two strain gauges disposed to measure the differential motion of the actuators. The strain gauges are preferably ranged to compensate for ambient temperature changes, e.g., in Wheatstone bridge fashion. Preferably, two strain gauges of identical type are disposed on each actuator to magnify the strain signal.

These and other aspects and advantages of the present invention will become better understood with regard to the following detailed description and accompanying drawings.

Figure 11:
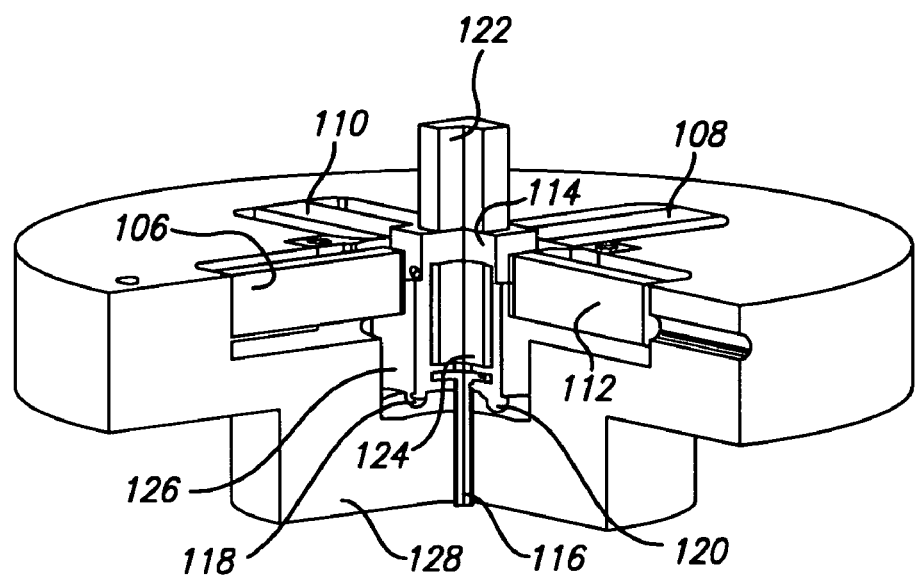
FIG. 11 is a perspective, partially cross-sectional depiction of a scanner in accordance with another embodiment of this invention. A bearing ball coupling is used having cross-conformed linear piezo stacks arranged along the x and y axes of the scanner, and which is rigid in the z axis.
Figure 12:
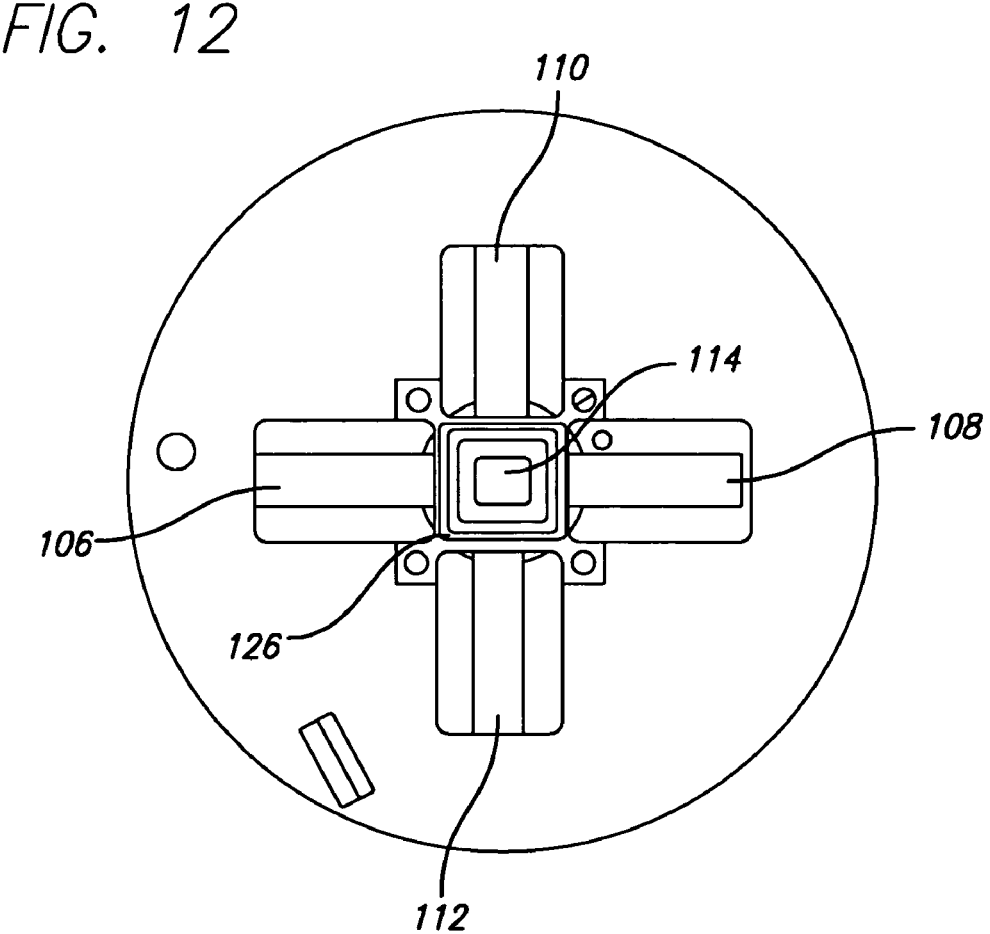
Figure 13:
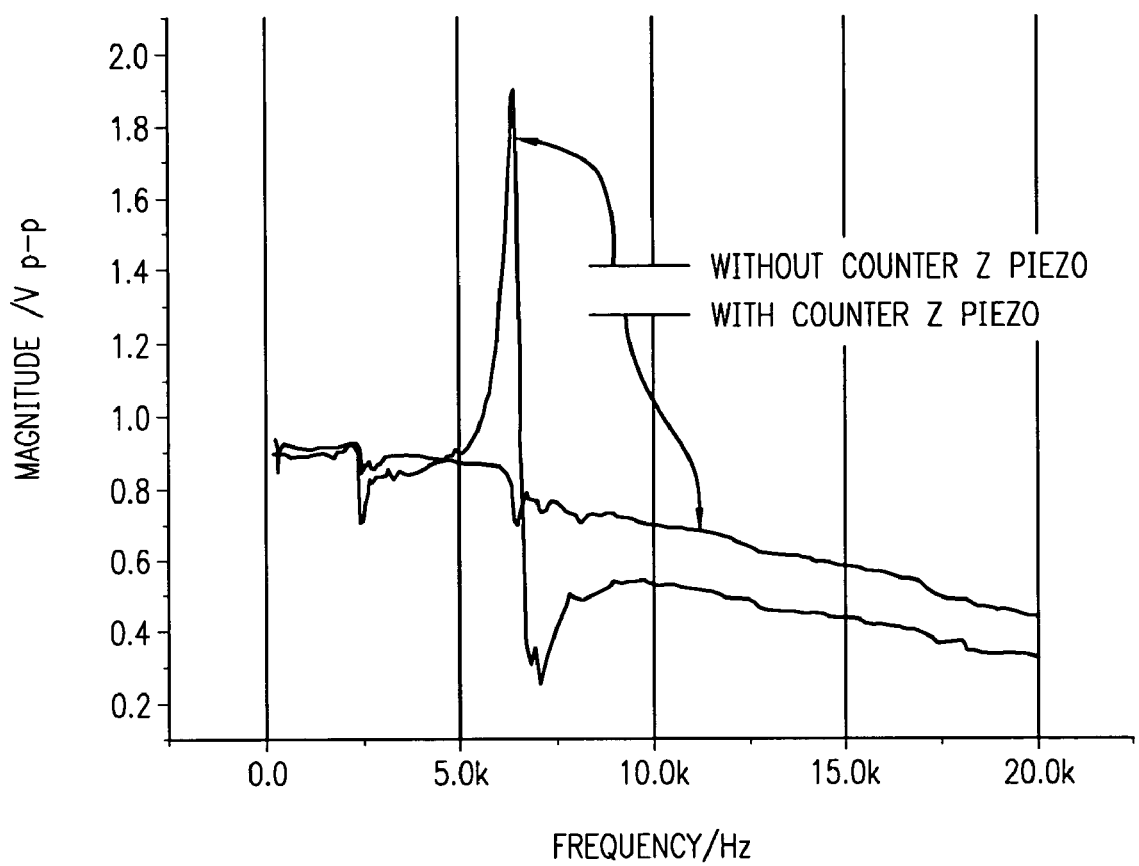
Figure 14:
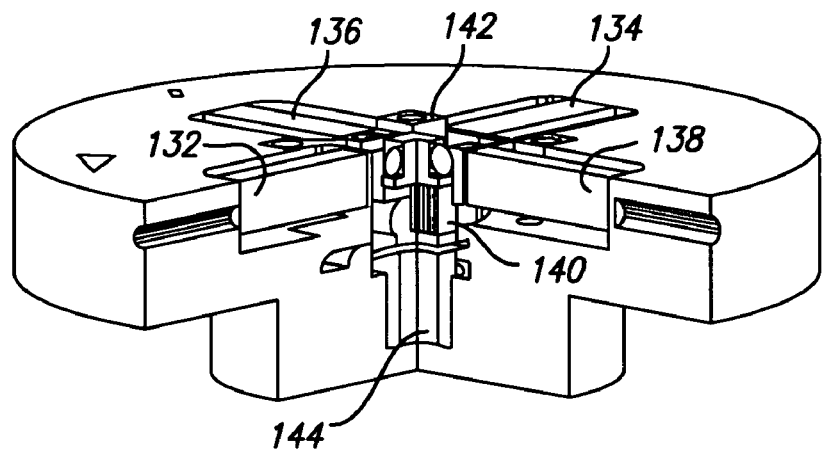
Figure 15:
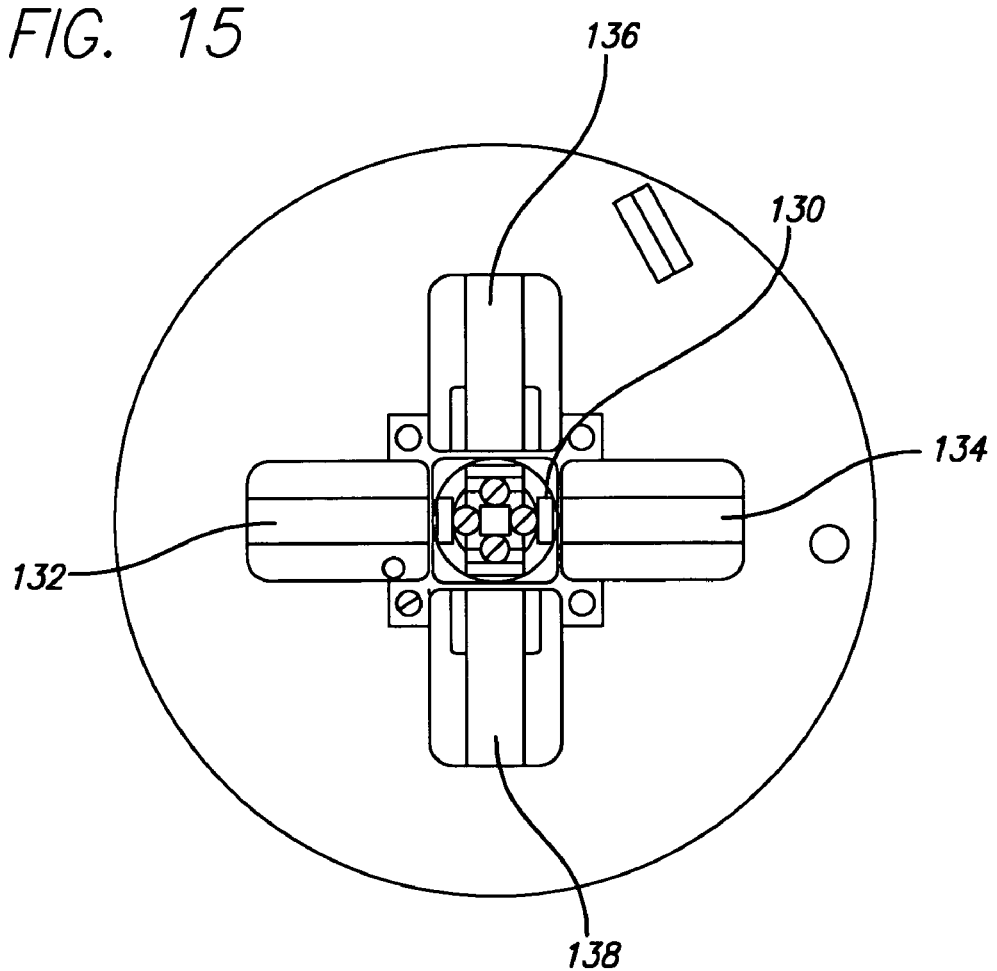
Figure 16:
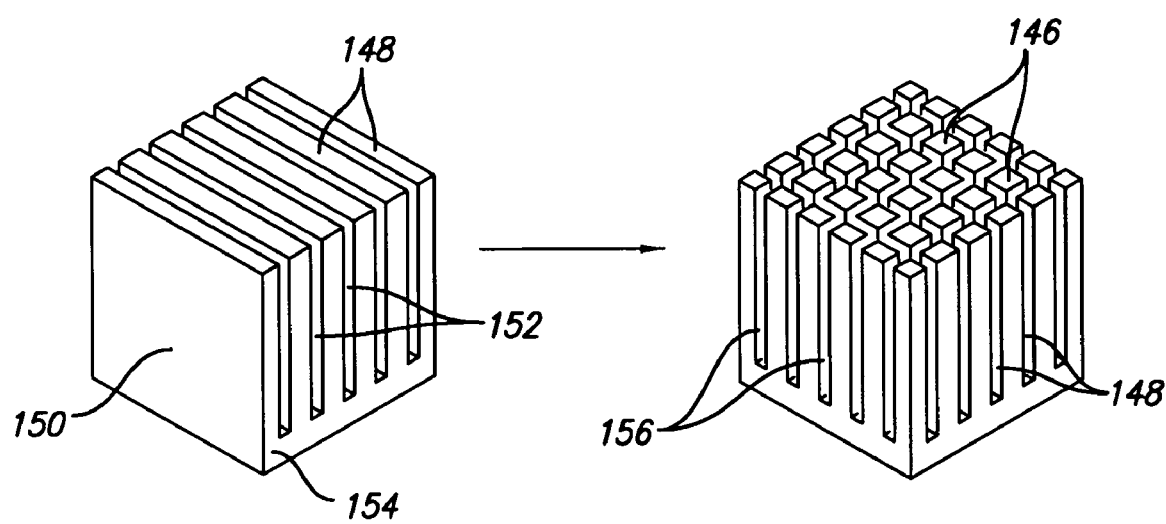
Figure 17:
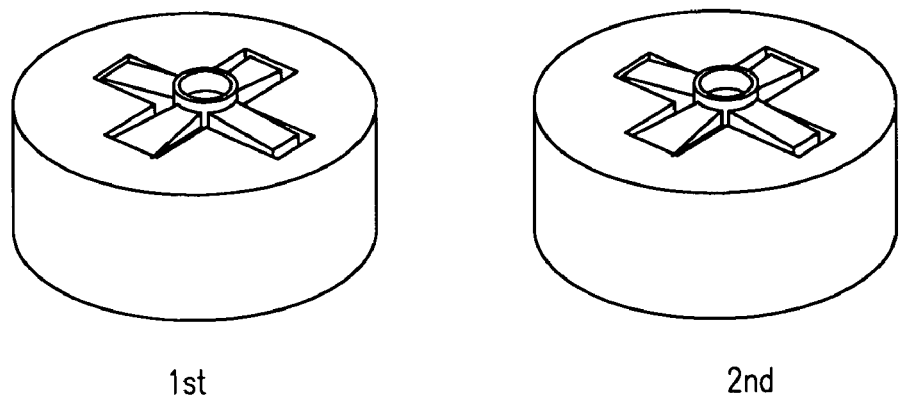

It provides rigid, stiff movement along each axis effectively decoupled from forces normal to the axis;

FIG. 12 is a schematic top view of the scanner of FIG. 11;

FIG. 13 shows plots of the frequency response of the bearing ball scanner of FIG. 11 with and without balance actuation from the lower z axis piezo stack;

FIG. 14 is a perspective, partially cross-sectional depiction of a scanner in accordance with another embodiment of this invention, using a combination of bearing ball and flexure couplings wherein bearing balls couple cross-conformed push-pull linear piezo stacks arranged along the x and y axes of the scanner, and a flexure couples cross-conformed push-pull linear piezo stacks arranged along the z axis, providing isolation from x-y movement of the z axis and rigid, stiff movement along each axis effectively decoupled from forces normal to the axis;

FIG. 15 is a schematic top view of the scanner of FIG. 14;

FIG. 16 schematically depicts the construction of a flexure coupling as used in the scanner of FIG. 14;

FIG. 17 depicts the first and second eigenfrequencies of a scanner with similar design as the one of FIG. 14

FIG. 18 shows plots of the step response of the top piezo, bottom, counter piezo, and balanced push-pull piezo combination of the bearing ball scanner of FIG. 11;

FIG. 19A depicts an unbalanced bridge configuration using one strain gauge, in a further embodiment of this invention; and FIG. 19B depicts a temperature compensated unbalanced bridge configuration using one strain gauge bridge using four strain gauges for higher sensitivity, in a still further embodiment of this invention.

DETAILED DESCRIPTION OF THE INVENTION

Figure 1:
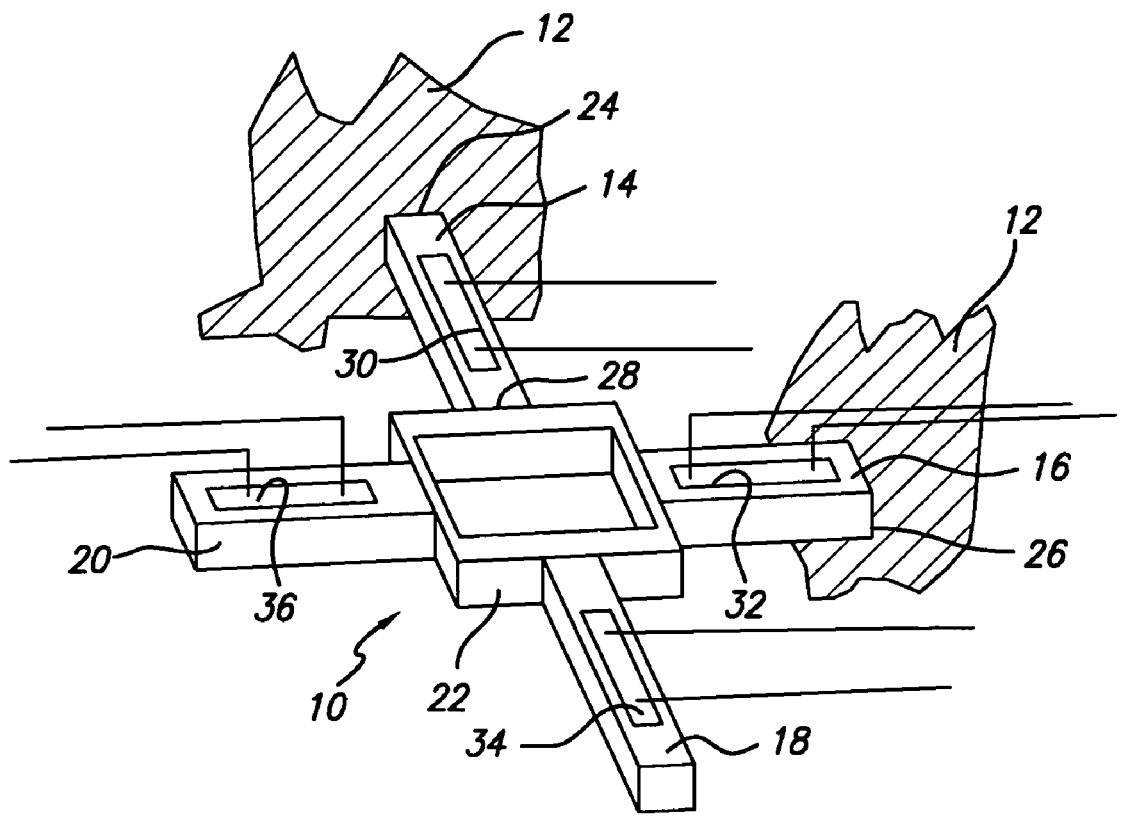
FIG. 1 is a perspective schematic depiction of generalized components of a scanner of this invention for a scanning probe microscope.

FIG. 1 schematically depicts generalized components of the scanner 10 for use in a scanning probe microscope of the invention. The scanner 10 includes a housing 12, at least two actuators 14 and 16 (possibly together with respective opposing actuators 18 and 20), each coupled to the housing 12, respectively at 24 and 26, and a support 22. The support 22 is also coupled to the housing (not shown in FIG. 1) and to at least one of the actuators at a position, e.g., at 28, spaced from the point 24 at which the actuator is coupled to the housing 12. The support 22 and its connections to actuators 14, 16, 18, and 20 are such that the support 22 constrains motion of each actuator along its axis while permitting translation normal to the axis. Strain gauge sensors 30, 32, 34, and 36 are applied to respective actuators 14, 16, 18, and 20 to enable measurement of expansion or contraction of the actuators.

Figure 2:
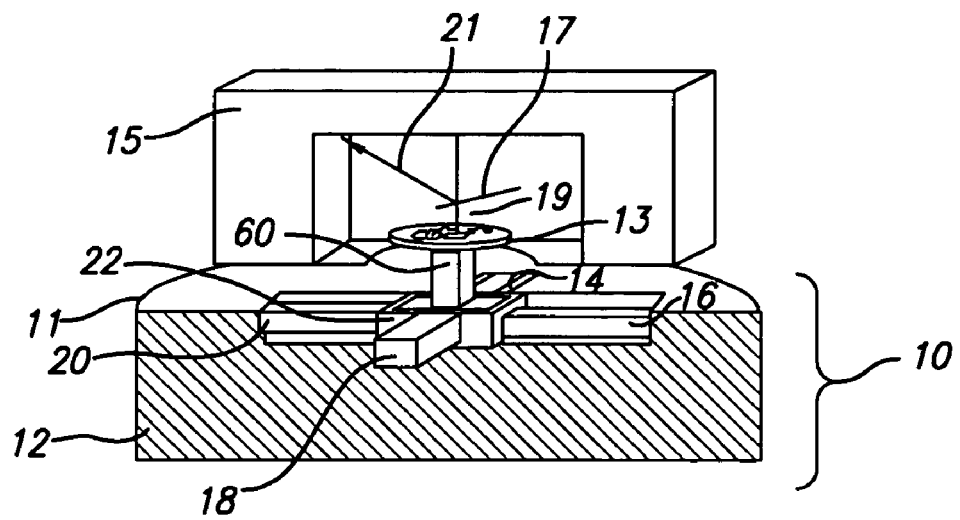
FIG. 2 is a perspective schematic depiction of generalized components of a scanning probe microscope of this invention.

Referring to FIG. 2, generalized components of a scanning probe microscope 11 of the invention are shown. The microscope 11 includes a sample carrier 13 itself carried by a top linear piezo stack 60, described in more detail with respect to FIG. 4. An AFM head 15 is disposed on the scanner housing 12 and carries a cantilever probe 17 having its tip 19 in contact with a sample carried by the sample carrier 13. The AFM head 15 includes a source (not shown) for a laser beam 21 that reflects from the back of the cantilever probe 17 to a detector (not shown).

The invention contemplates a number of configurations, which will be described in detail below.

Figure 3:
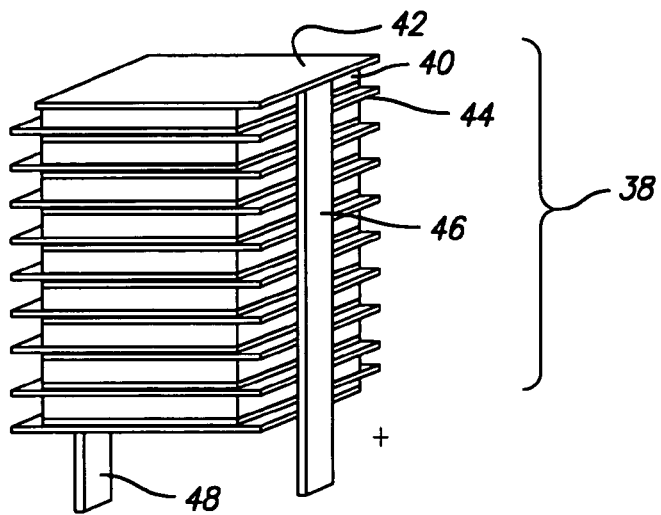
FIG. 3 is a perspective schematic depiction of a linear piezo stack used in this invention, formed of insulated layers of flat piezo plates.

The scanner 10 uses piezoelectric crystals ("piezos") as actuating components. However, and referring to FIG. 3, these piezos are not single crystals, but are linear piezo stacks. Each stack 38 is formed of layers of piezoelectric material 40 and electrically conducting plates 42 separated by insulating layers 44 and electrically connected in parallel, e.g., by electrical connectors 46 and 48. Arranging the single crystals in parallel increases the expansion range of the stack determined only by the number of stacked single crystals. However, the mechanical resonance frequency of the piezo stack is lowered by each additional layer. In addition, each additional layer does add more capacitance to the stack, increasing the capacitive load on the amplifier.

Such piezos are commercially available, e.g., from NEC/Tokin (Part#AE0505D16). Various sizes are available with different achievable displacements, ranging from 2 µm to 16 µm and capacitances ranging from 0.1 µF to 1.5 µF. The choice of piezo depends on the desired scan range and the needed frequency response.

A number of design parameters must be considered to obtain maximum speed performance of the scanner:

(a) One of the most significant goals is to reduce mechanical oscillations while imaging by providing a rigid design with high first order resonance frequencies.

(b) The x, y and z axis of the scanner must be located perpendicular to each other, but they have to be decoupled from each other, and electrical and mechanical cross-coupling has to be avoided.

(c) All mechanical joints have to be stiff in the actuation direction to ensure direct response of the sample area to piezo actuation.

(d) Mechanical deformation during operation has to be within elastic limits, and mechanical stress levels during operation have to be accounted for.

(e) The x and y axes should be symmetrical to enable image rotation to be implemented.

The main objective for fast scanning is to achieve the strict proportionality between the actuation signal and the translation of the sample disc. Resonances of the scanner distort the proportional response. Resonances in the x- and/or y-directions deform features in the image. Resonances in z-direction result in a waved appearance of otherwise flat surfaces, and for many applications are the most critical to suppress. Thus, the aim of the design is to shift the first eigen-resonance to higher frequencies. There are three ways to do this: reduce the moving mass, use rigid construction whenever possible, and avoid long mechanical levers, especially involving the sample holder. All three approaches have to be used and tradeoffs have to be made between them. As will be described in more detail below, to quantify the resonance behavior of the scanner, we tested the design for its first eigenfrequencies using finite element analysis.

Figure 4:
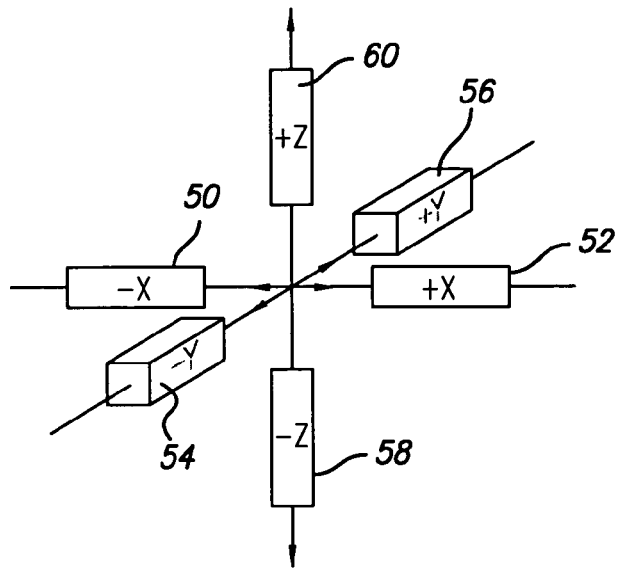
FIG. 4 schematically depicts the arrangement of linear piezo stacks for a cross-conformation push-pull scanner design in accordance with this invention.
Figure 5:
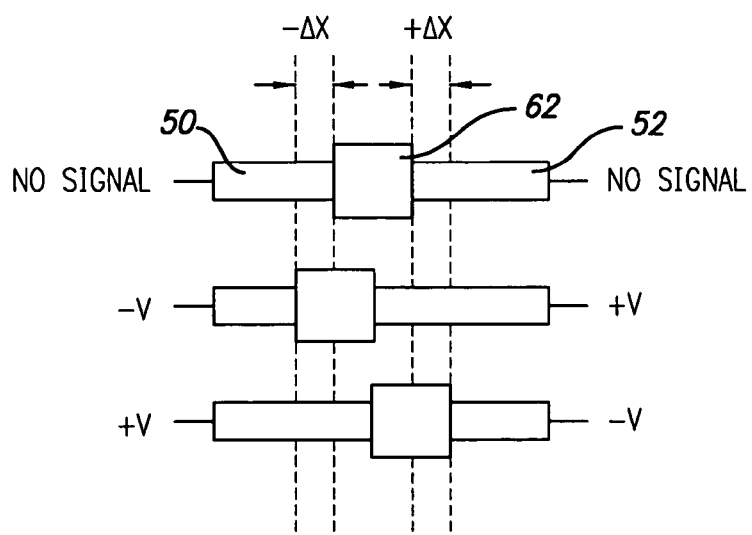
FIG. 5 schematically depicts translation of the center of the push-pull configuration of linear piezo stacks defining the x axis of the scanner.

The scanner designs of this invention have a Cartesian conformation where we have separate actuators for each translation direction. Since a piezo's primary ability is to apply force when expanding but not when contracting, in accordance with a preferred embodiment, we chose to have two piezos for each axis to allow movement in opposite directions. Referring to FIG. 4, a pair of opposed linear piezo stacks 50 and 52 are disposed in push-pull fashion to define the x axis of the scanner, two linear piezo stacks 54 and 56 are similarly disposed to define the y axis, and another two linear piezo stacks 58 and 60 are similarly disposed to define the z axis. Referring to FIG. 5, the two piezos in each pair are electrically connected complimentarily, so that when one piezo expands, the other one contracts, resulting in a translation of a center support 62. Since the piezos that were used are unipolar, a DC-offset of half the voltage range (+75V) is applied to both piezos representing the no signal position (or the neutral or center position, or the center of the scan range).

In order to expand this principle to the y-direction (perpendicular to the image plane of FIG. 5), the coupling between each piezo and the center support 62 is critical. Ideally, this connection would be totally rigid in the direction the piezo moves the sample, but totally flexible in the other two directions. Several implementations of this coupling are described below, using either "flexure" coupling, bearing ball coupling, or both.

Flexure Coupling

Figure 6:
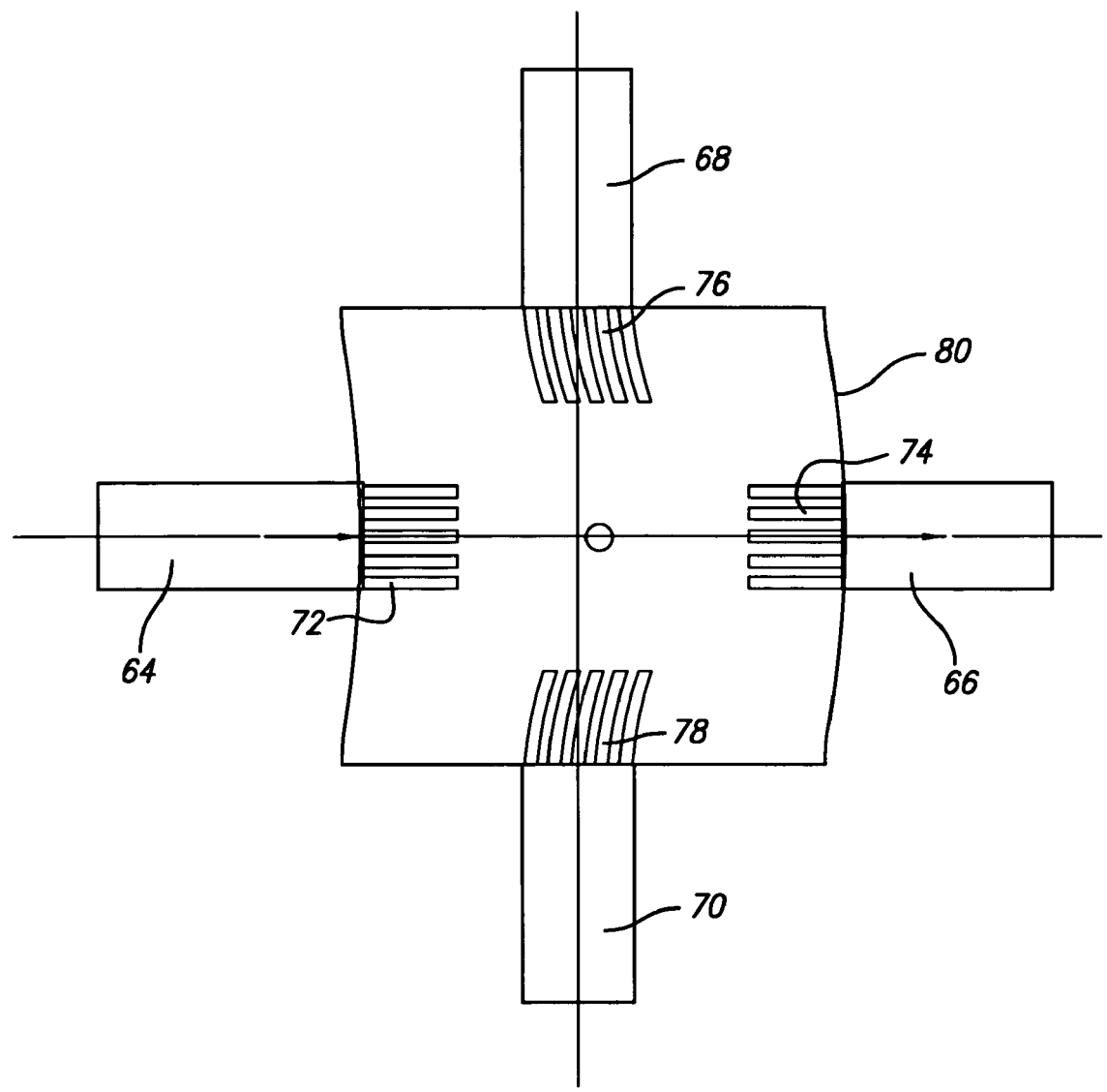
FIG. 6 schematically depicts a scanner with flexure coupling of cross-conformed push-pull linear piezo stacks arranged along the x and y axes of the scanner, and rigid in the z axis, in accordance with an embodiment of this invention, providing rigid, stiff movement along each axis effectively decoupled from forces normal to the respective x and y axis.

FIG. 6 schematically depicts a flexure coupling of cross-conformed push-pull linear piezo stacks 64, 66 and 68, 70, respectively arranged along the x and y axes of the scanner, and rigid in the z axis. The scanner has flexure couplings, respectively 72, 74, 76 and 78 between the piezos and the flexing support frame 80. The left side (in the drawing) x axis piezo 64 expands as the right side x axis piezo 66 contracts, causing the blade springs (described below) of both y axis flexures 76 and 78 to bend, allowing movement of the x axis piezo stacks 64, 66 to move the center member 82 of the scanner to the left.

Figure 7:
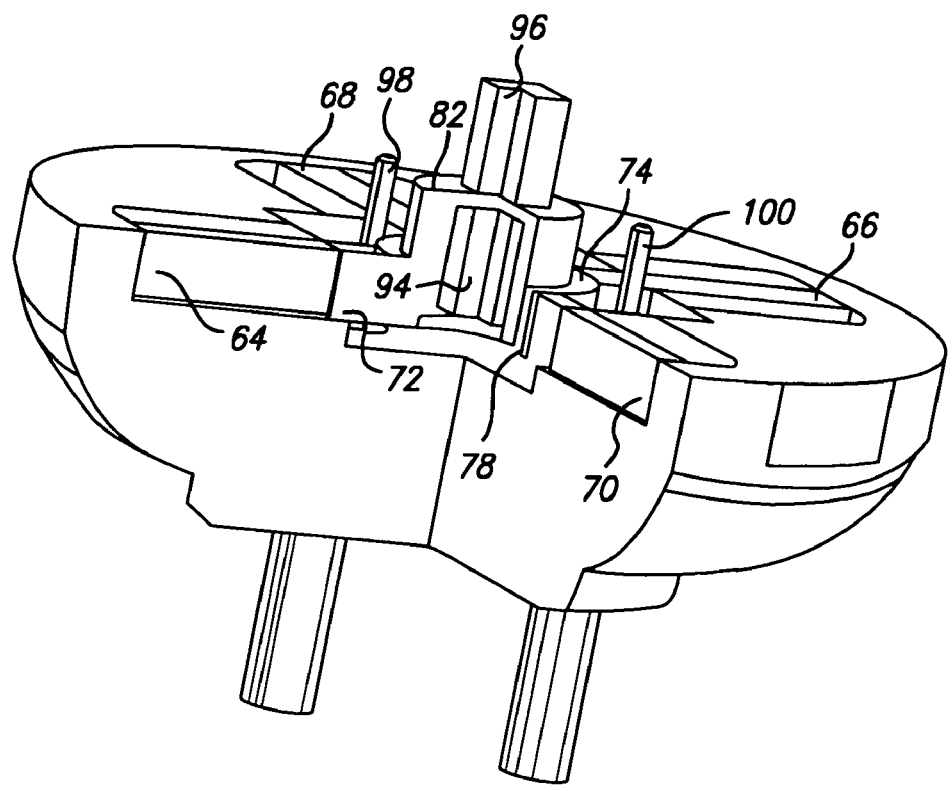
FIG. 7 is a perspective, partially cross-sectional depiction of a scanner using the flexure coupling of FIG. 6.
Figure 8:
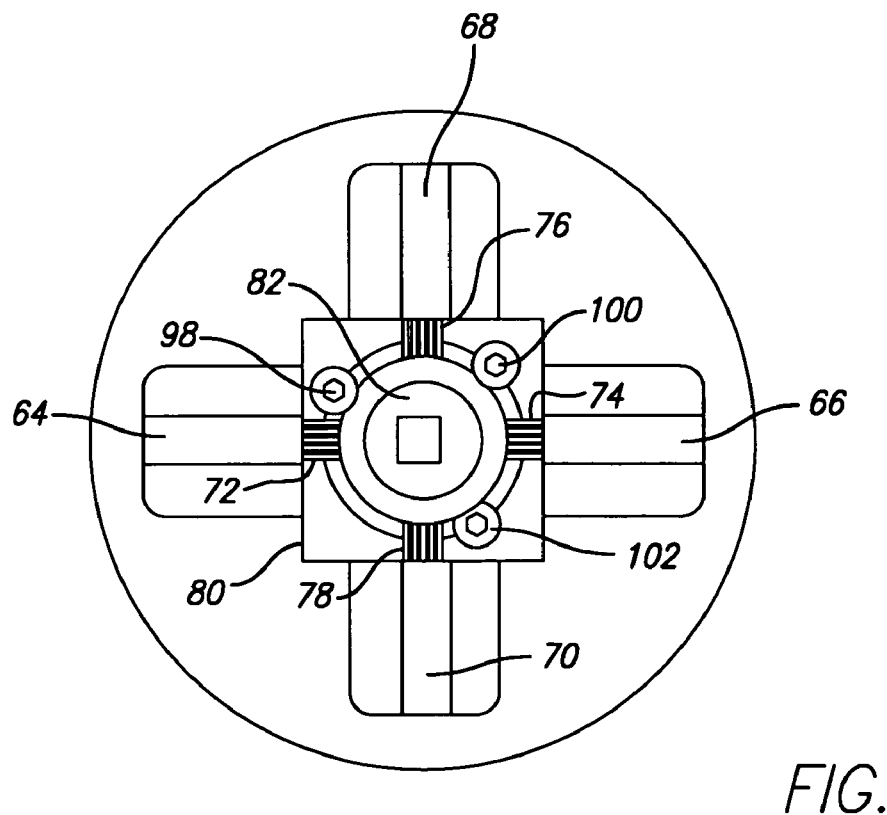
FIG. 8 is a schematic top cross-sectional view of the scanner of FIG. 6 depicting the flexure coupling in more detail than FIG. 4.

The flexure couplings 72, 74, 76 and 78 provide rigid, stiff movement along the respective x and y axes effectively decoupled from forces normal to the respective axes. FIGS. 7 and 8 depict, respectively in partial cross-section and in schematic top view a scanner using the flexure coupling of FIG. 6. The piezos 64, 66, 68 and 70 laterally move the whole center member 82 including counter balanced piezos 94 and 96 for the z direction. The sample is mounted on the upper of the two z piezos. The lower z axis piezo serves as a balance (which will be described further below) for the upper z axis piezo 96. The center member 82 is coupled to the piezos by respective flexures 72, 74, 76 and 78, each formed of an array of blade springs. As described above, the flexures are rigid in their axial directions (parallel to the blades) but flexible perpendicular to the blades. Therefore, the center member 82 can be moved in the x and y directions, but is rigid in the z-direction. Fine pitched screws 98, 100 and 102 serve to connect the scanner to the AFM head.

Figure 9:
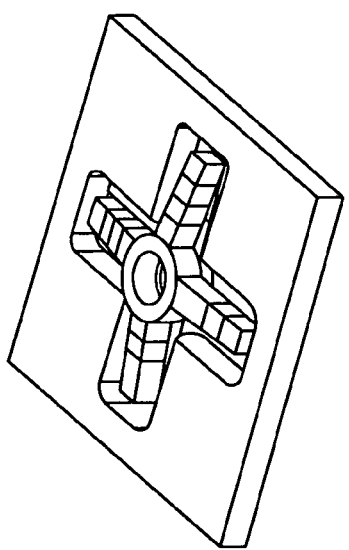
FIG. 9 depicts the first eigenfrequency of the flexure used in the scanner of FIG. 6, without side support, obtained by finite element simulation.
Figure 10A:
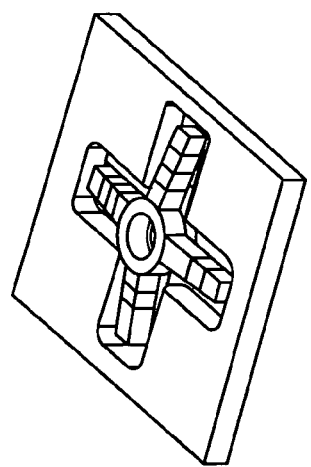
FIG. 10A depicts the first, third, and fifth eigenfrequencies of the flexure used in the scanner of FIG. 6, without side support.
Figure 10B:
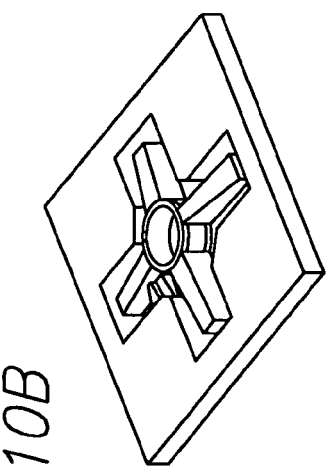
FIG. 10B depicts the first, third, and fifth eigenfrequencies of the flexure used in the scanner of FIG. 6, with side support.

Referring to FIG. 9, the first eigenfrequency of the cross-configuration flexure used in the scanner of FIG. 6, without side support, was obtained by finite element simulation. The analysis showed that the first eigenfrequency of the moving system is a transversal vibration of the piezos with the center moving with the biggest amplitude. This is highly undesirable for an AFM scanner. In order to prevent these vibrations, and in accordance with the invention, the flexing support frame 80 is added around the center and attached to the body of the scanner. The frame is rigid in the z direction, but flexible in the directions the x and y piezos push the sample. FIG. 10A depicts the first, third, and fifth eigenfrequencies of the flexure used in the scanner of FIG. 6, without side support obtained by finite element analysis. FIG. 10B depicts the first, third, and fifth eigenfrequencies of the flexure used in the scanner of FIG. 6, with side support. The results are set forth in Table 1. With side supports, the mass and dimensions of the piezos no longer contribute to the vibrations of the scanner center so that larger piezos with more displacement can be used without slowing the system down in directions perpendicular to their actuation.

TABLE 1

| Eigenfrequency Number | $f_0$ Without side supports (Hz) | $f_0$ With side supports (Hz) |
| --- | --- | --- |
| 1 | 5814 | 10590 |
| 2 | 11870 | 16949 |
| 3 | 12026 | 17009 |
| 4 | 12212 | 18761 |
| 5 | 12277 | 24131 |
| 6 | 12331 | 24959 |

Bearing Ball Coupling

FIGS. 11 and 12 depict, respectively in partial cross-section and in schematic top view, a scanner using a bearing ball coupling of cross-conformed linear piezo stacks 106, 108 and 110, 112, respectively arranged along the x and y axes of the scanner, and rigid in the z axis, providing rigid movement along each axis effectively decoupled from forces normal to the axis. The center member 114 is mounted on the base of the scanner with a 1-72 screw 116 that presses the center piece onto three bearing balls, two of which, 118 and 120, being shown in FIG. 11. The top and bottom balanced z-piezos 122 and 124 are mounted on the center piece. The x and y piezos, respectively 106, 108 and 110, 112, move the center member 114 by pushing on bearing balls that in turn push on the center piece. This approach is fundamentally different from the flexure design shown in FIGS. 6-8. In the flexure scanner, the connections between the x and y piezos and the center member provide support to the center member in the x- and y-directions, as well as in the z-direction. In the bearing ball design, the z support is given by the three bearing balls on the bottom. This results in a much higher resonance frequency in the important z-direction (e.g., simulated 27 kHz) so that the center section is better supported, therefore improving performance.

The x and y axis piezos in this embodiment are also supported at their inner ends by a flexing frame 126 that couples them to the base 128. This increases the resonance frequency of the assembly considerably, as described with respect to FIGS. 6-8. The moving mass in this assembly is mainly determined by the mass and size of the two z-piezos. A tradeoff has to be made here between scan-range and resonance frequency. The frequency spectrum of this scanner is shown in FIG. 13, showing a resonance peak at around 6 kHz; the effect of the resonance is very well compensated by the counter piezo.

Combined Flexure and Bearing Ball Couplings

In a further embodiment, in order to further reduce the moving mass of the scanner, a combination of the bearing ball support for the x, y directions and a flexure for the support in z direction is implemented. FIGS. 14 and 15 depict, respectively in partial cross-section and in schematic top cross-sectional view, a scanner in accordance with another embodiment of this invention, using a combination of bearing ball and flexure couplings wherein bearing balls 130 couple cross-conformed linear piezo stacks 132, 134 and 136, 138 arranged respectively along the x and y axes of the scanner, and a flexure 140 couples balanced piezo stack pair 142 and 144 arranged along the z axis, providing isolation from x-y movement of the z axis and rigid, stiff movement along each axis effectively decoupled from forces normal to the axis.

FIG. 16 schematically depicts the construction of a flexure coupling as used in the scanner of FIGS. 14 and 15. In essence, the flexure is an array of rods 146, each of which is rigid along its axis while being compliant in the translational directions normal to its axis. Along its axis, a rod has a spring constant determined by its length, its cross-section, and its elastic modulus in compression. Laterally, a rod has the spring constant of a bending beam. The spring constant in all translational directions scales linearly with the number of rods, the ratio between axial and lateral spring constants being conserved.

As shown in FIG. 16, the flexure can be constructed by machining a series of parallel cuts 148 into a block 150 of suitable material, e.g., beryllium-copper, aluminum, stainless steel, etc., leaving a series of blades 152 of the material attached on one side of a base 154. The piece is then rotated and a second series of cuts 156 is machined perpendicular to the first set, leaving the array of rods 146. The cutting is virtually frictionless by using wire electron discharge machining (wire-EDM).

The main difference between the embodiment of FIGS. 14 and 15 compared to the previous embodiments is that the piezos for the z direction are not being translated in x and y direction. The balanced z piezos are stationarily mounted on the base of the scanner, supported on one side by the base and coupled on the other side to a flexure. When the z-piezo expands, it moves the 2D-flexure plus the center piece up and down.

The x, y support by bearing balls had proven very effective, and was therefore only slightly modified from the previous version. FIG. 17 shows the first two eigenfrequencies of a scanner of this design type. Table 2 lists the first six eigenfrequencies of this scanner.

TABLE 2

| Eigenfrequency Number | Frequency (Hz) |
| --- | --- |
| 1 | 44048 |
| 2 | 45296 |
| 3 | 45384 |
| 4 | 48710 |
| 5 | 55839 |
| 6 | 66667 |

In the embodiments of this invention, z actuation is implemented using a pair of piezo stacks in "balanced configuration". The two piezos are electrically connected in parallel, in order to minimize the impulse applied onto the center piece. When the upper piezo expands, it accelerates the sample. The impulse on the sample also gets transmitted to the center member of the scanner, thereby exciting the z-resonance of the scanner. To minimize this, a second piezo is mounted underneath the primary z-piezo. It expands and contracts in phase with the primary piezo. The counter piezo exhibits as much impulse on the center member as the primary piezo, ideally resulting in no effective impulse on the scanner's center piece. FIG. 13 shows the frequency spectrum of the bearing ball scanner with and without the counter piezo activated. One can see that the resonance at 6 kHz is reduced considerably in magnitude when using the counter balance piezo. For imaging, the oscillations in the step-response result in ripples behind edges in the image. When using the balanced actuation, this effect is reduced considerably. This behavior is also shown in the step response of the scanner, shown in FIG. 18

Strain Gauge Sensors

The expansion of the piezos is measured by metal foil strain gauges. When stress is applied to the strain gauges, their resistance increases. In order to measure this small effect, strain gauges are normally one active part in a resistor bridge as shown in FIG. 19A. Strain gauges have the disadvantage of being temperature sensitive. When the temperature of the strain gauge rises it changes its resistance. This would be interpreted as a change in expansion of the piezo. Standard strain gauge procedures take care of this problem by replacing one or more of the resistors by dummy strain gauges that do not measure strain but eliminate the temperature influence in the bridge circuit. However, the signal change is not very large for expansions of the piezos of the order of μm. The output signal of the bridge can be calculated for a change of ΔR in resistance of the strain-gauge due to a change in strain.

$$U_{Sig} = U_{in}\left(\frac{R_2}{R_1 + R_2} - \frac{R_{SG}}{R_3 + R_{SG}}\right)$$

$$\Delta U_{Sig} = U_{in}\left(\frac{R_{SG}}{R_3 + R_{SG}} - \frac{R_{SG_1} + \Delta R_{SG}}{R_3 + (R_{SG} + \Delta R_{SG})}\right)$$

assuming $\Delta R_{SG} \ll R_{SG}$ $$\Delta U_{Sig} = U_{in}\left(\frac{-\Delta R_{SG}}{R_3 + R_{SG}}\right)$$

for: $R = R_{SG} = R_3$ $$\Delta U_{Sig} = U_{in}\left(\frac{-\Delta R}{2R}\right)$$

In the foregoing equations, $U_{in}$ is the voltage applied to the input terminals of the strain gauge bridge, $U_{Sig}$ is the voltage between the output terminals of the strain gauge bridge and $R_x$ is the resistance of the particular resistors In the linear stack scanner, a different full bridge compensation was used. Two identical strain gauges were glued to each piezo stack in order to magnify the strain gauge signal. The strain gauges for the two piezo stacks for each direction are connected as shown in FIG. 19B. The strain gauges $S_{G1}$ and $\overline{S_{G1}}$ are glued onto one piezo and $S_{G2}$ and $\overline{S_{G2}}$ onto the second piezo for each direction. When piezo 1 expands, piezo 2 contracts, the strain gauges $S_{G1}$ and $\overline{S_{G1}}$ get higher resistance and the strain gauges $S_{G2}$ and $\overline{S_{G2}}$ get lower resistance. This approach has several advantages:

as long as the temperature of the two piezos is identical, an absolute temperature change does not change the output of the bridge, the output of the full bridge signal gets doubled, this increases the sensitivity and improves the signal to noise ratio and the full bridge is attached rigidly to the piezos The output signal from the strain gauge bridge is then $$U_{Sig} = U_{in}\left(\frac{\overline{R_{SG_2}}}{\overline{R_{SG_1}} + \overline{R_{SG_2}}} - \frac{R_{SG_1}}{R_{SG_2} + R_{SG_1}}\right)$$

for $\Delta R \ll R_{SG_1}, R_{SG_2}$ $$\Delta U_{Sig} = U_{in}\left(\frac{\overline{R_{SG_2}} + \Delta R}{\overline{R_{SG_1}} + \overline{R_{SG_2}}} - \frac{R_{SG_1} - \Delta R}{R_{SG_2} + R_{SG_1}}\right)$$

for: $R = R_{SG_1} = R_{SG_2} = \overline{R_{SG_1}} = \overline{R_{SG_2}}$ $$\Delta U_{Sig} = \frac{\Delta R}{R}$$

A constant voltage (10V) is applied to the $U_{in}$ terminals of the full bridge. This results in an output signal of the strain gauges of 20 mV. In order to minimize noise, amplification of this signal (located close to the bridge) is needed. Amplification is done by an instrumentation amplifier. Because the outputs of the bridge are close to 5V DC and the AC component of the signal is small, a high common mode rejection is needed (at least 110 dB).

Triangular Scanning vs. Sine Wave Scanning

In conventional Atomic Force Microscopes a triangular wave is used to scan the sample with respect to the cantilever tip. Height and deflection information can then be linearly plotted over time to represent position on the surface. For fast imaging this approach is very unfavorable, because the acceleration forces on the scanner at the turn around points are very high. Higher order resonances are being excited since the triangular wave is composed of higher order Fourier components. This very much distorts the image. For fast imaging it is better to scan the sample with a sine wave and account for the nonlinearity when plotting the image.

The invention claimed is:

1. A scanning probe microscope, comprising:
   a probe;
   a housing;
   at least two actuators, each coupled to the housing; and
   a flexure coupled to the housing and to at least a first of the actuators at a position spaced from the point at which the actuator is coupled to the housing.

2. The scanning probe microscope of claim 1 in which the actuators are arranged in opposed push-pull configuration.

3. The scanning probe microscope of claim 1 in which the actuators are orthogonally arranged linear piezo stacks.

4. The scanning probe microscope of claim 1 in which the flexure is coupled to at least one actuator at an end opposite the end coupled to the housing.

5. The scanning probe microscope of claim 1 wherein the flexure constrains the motion of the first actuator along a first axis while permitting translation along a second axis.

6. A scanning probe microscope, comprising:
   a probe;
   a scanner for the microscope having a support frame with x and y axes, and
   a member for supporting a sample for the probe, the scanner comprising a
   flexure and flexure coupled cross-conformed actuators arranged along said x
   and y axes.

7. The scanning probe microscope of claim 6 in which the flexure couplings are between the actuators and the support frame.

8. The scanning probe of claim 6 in which actuators are arranged on opposite sides of the support frame in push-pull configuration.

9. The scanning probe microscope of claim 6 in which said sample supporting member is in the center of the support frame.

10. The scanning probe microscope of claim 6 in which the flexures are formed of blade springs.

11. The scanning probe microscope of claim 10 in which the blade springs are arranged so that as there is actuators expansion along a first of said x and y axes, the blade springs along the second of the x and y axes bend to permit movement along said first axis.

12. The scanning probe microscope of claim 6 in which the actuators are orthogonally arranged piezos.

13. The scanning probe microscope of claim 12 in which the piezos are linear piezo stacks.

14. The scanning probe microscope of claim 6 including cross-conformed actuators arranged along the z axis.

15. The scanning probe microscope of claim 14 in which the actuators are orthogonally arranged piezos.

16. The scanning probe microscope of claim 15 in which the piezos are linear piezo stacks.

17. A scanning probe microscope, comprising:
    a probe;
    a scanner for the microscope having a support frame with x and y axes and a centrally disposed member for supporting a sample for the probe, the scanner comprising a flexure, cross-conformed push-pull linear piezo stacks arranged along said x and y axes, and flexure couplings formed of blade springs between the piezos and the support frame on opposite sides of the support frame, arranged so that as there is piezo expansion along a first of said x and y axes, the blade springs along the second of the x and y axes bend to permit movement along said first axis.

18. A scanner, comprising:
    a support frame with x and y axes and a member for supporting an object to be moved, the scanner comprising a flexure and flexure coupled cross-conformed piezos arranged along x and y axes.

19. The scanner of claim 18 in which the flexure couplings are between the piezos and the support frame.

20. The scanner of claim 18 in which piezos are arranged on opposite sides of the support frame in push-pull configuration.

21. The scanner of claim 18 in which the object support member is in the center of the support frame.

22. The scanner of claim 18 in which the flexures are formed of blade springs.

23. The scanner of claim 22 in which the blade springs are arranged so that as there is piezo expansion along a first of said x and y axes, the blade springs along the second of the x and y axes bends to permit movement along said first axis.

24. The scanner of claim 18 in which the piezos are linear piezo stacks.

25. A scanner, comprising:
    a support frame with x and y axes and a centrally disposed member for supporting an object to be moved, the scanner comprising a flexure, cross-conformed push-pull linear piezo stacks arranged along said x and y axes, and flexure couplings formed of blade springs between the piezos and the support frame on opposite sides of the support frame, arranged so that as there is piezo expansion along a first of said x and y axes, the blade springs along the second of the x and y axes bend to permit movement along said first axis.

* * * * *

UNITED STATES PATENT AND TRADEMARK OFFICE
CERTIFICATE OF CORRECTION

PATENT NO. : 7,278,298 B2  Page 1 of 1
APPLICATION NO. : 11/000589
DATED : October 9, 2007
INVENTOR(S) : Paul Hansma et al.

It is certified that error appears in the above-identified patent and that said Letters Patent is hereby corrected as shown below:

COLUMN  LINE
1           7

This invention was made with Government support under Grant No. NSF-DMR9988640 and DMR0080034 awarded by the National Science Foundation and by NASA under Award No. NCC-1-02037. The Government has certain rights in this invention.

Signed and Sealed this

Twelfth Day of August, 2008

JON W. DUDAS
*Director of the United States Patent and Trademark Office*